(No Model.)
T. HYATT.
VAULT COVER OR ILLUMINATING GRATING TILE AND SURFACE MADE THEREOF.
No. 288,571. Patented Nov. 13, 1883.
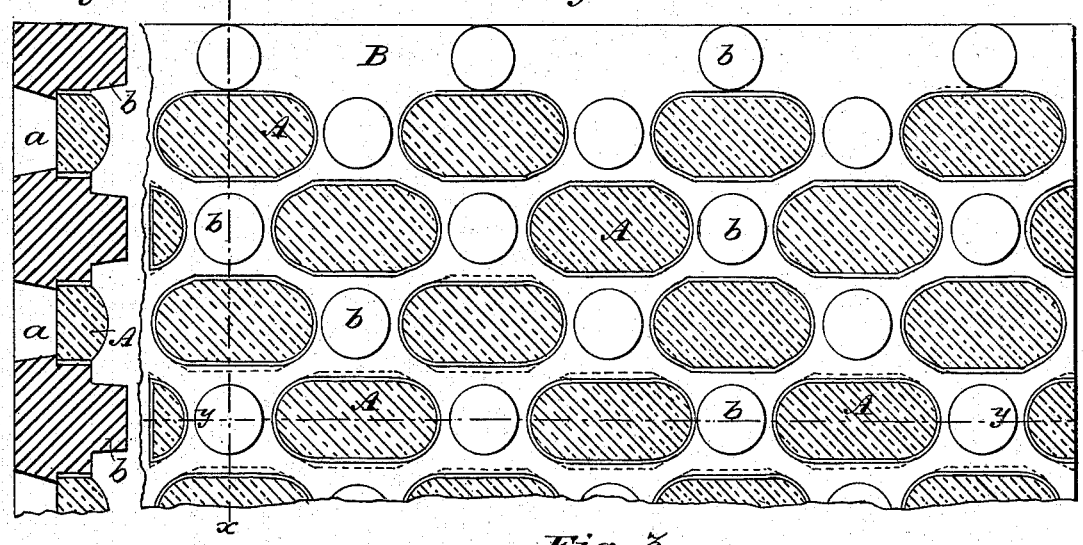
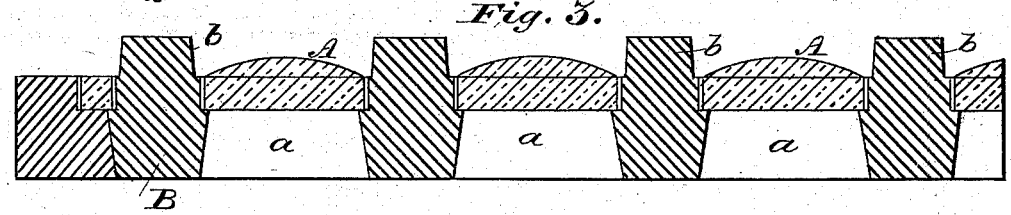
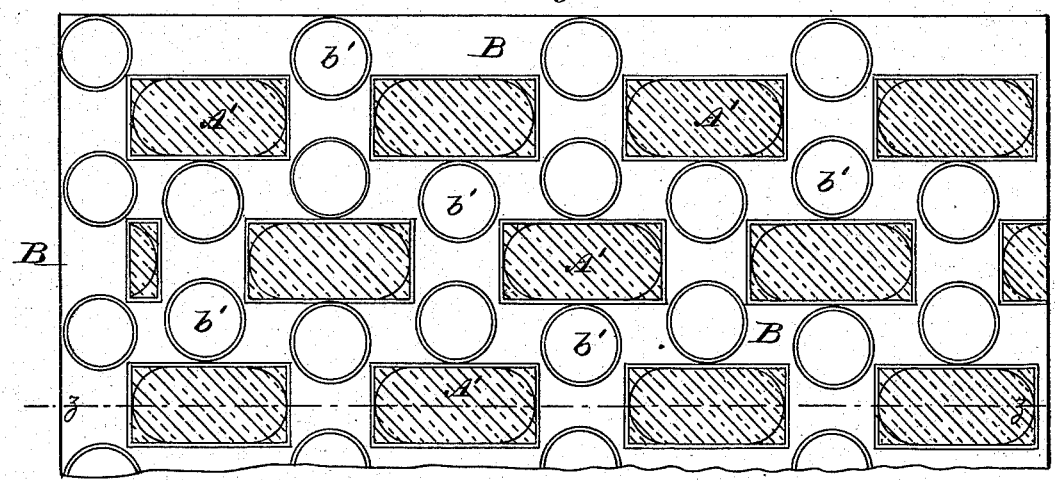
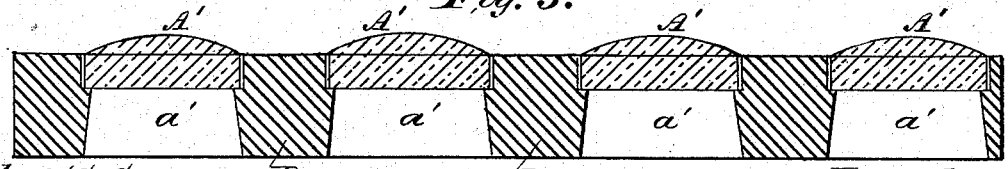
Witnesses:
T. C. Brecht
J. A. Edelin
Inventor:
Thaddeus Hyatt

UNITED STATES PATENT OFFICE.

THADDEUS HYATT, OF NEW YORK, N. Y.

VAULT-COVER OR ILLUMINATING GRATING-TILE AND SURFACE MADE THEREOF.

SPECIFICATION forming part of Letters Patent No. 288,571, dated November 13, 1883.

Application filed October 20, 1883. (No model.) Patented in England August 2, 1877, No. 2,968.

*To all whom it may concern:*

Be it known that I, THADDEUS HYATT, a citizen of the United States, residing at the city of New York, in the county of New York and State of New York, have invented certain new and useful Improvements in Vault-Covers or Illuminating Grating-Tiles and Surfaces Made of Them, of which the following is a description, reference being had therein to the accompanying drawings, making a part of this specification.

My invention relates to the style of illuminating gratings called "knob-lights." The glasses of these lights as commonly made are circular lenses, the convex face above the metal being protected by six knobs or buttons of iron placed around each glass. The objection to these lights is that the glasses get scratched because the knobs are too far apart, and to lessen the size of the glasses in order to bring the knobs nearer together would make a tile as objectionable on the score of loss of light in this way.

The object of my invention is to get the knobs nearer together and still not sacrifice the light of the grating.

Figure 1 represents my improved light in plan; Fig. 2, in cross-section of the plan on the line *x x*. Fig. 3 is a longitudinal section on the line *y y*. Fig. 4 represents oval lenses on an oblong base. Fig. 5 is a longitudinal section of 4 on the line *z z*.

A indicates oval lenses; *a*, oval light-holes; A', oval lenses on an oblong base; *a'*, oblong light-holes.

B indicates the metal grating; *b*, the knobs of iron placed between the ends of the oval lenses.

*b'* indicates buttons placed between the ranges of glasses and not placed between the ends of the light-holes.

The novel features that constitute my invention are, first, oval lenses; second, oval lenses on an oblong base; third, oval break-joint glasses lengthwise or end to end in parallel lines; fourth, oval lenses on oblong bases lengthwise or end to end in parallel lines breaking joint with each other; fifth, protecting the sides of the glasses in one range by the knobs that are placed only at the ends of the glasses in the other and adjoining ranges; sixth, interlocking ranges of glasses with no valley space between the same.

The chief features of merit are represented in Fig. 1. In this figure we have an oblong glass of oval shape, so narrow that the knobs give complete protection to the sides of the glasses when placed only between the ends of the glasses in the ranges, the ranges being brought as near together as possible by interlocking.

The construction of these lights differing in no respect from the construction of the ordinary and well-known light, no further description of the invention is necessary.

What I claim, and desire to secure by Letters Patent, is—

1. A metal perforated plate or grating-tile formed with oval-shaped light-holes.

2. A metal porforated plate or grating-tile formed with oval-shaped light-holes placed end to end in a straight line, a protecting knob or button of metal being cast or formed on the plate between the ends of the light-holes.

3. A metal perforated plate or grating-tile cast or formed with parallel interlocking ranges of oval-shaped light-holes placed end to end, and buttons or knobs of metal between the ends, the light-holes in each range breaking joints with the light-holes of the ranges immediately on each side of it, so that the buttons or knobs between the ends of the light-holes in such ranges on each side of it become protectors at the sides as well as at the ends of light-holes.

4. A metal perforated plate or grating-tile cast or formed with parallel interlocking ranges of oval-shaped light-holes placed end to end, and buttons or knobs of metal between the ends, the light-holes in each range breaking joints with the light-holes of the ranges immediately on each side of it, so that the buttons or knobs between the ends of the light-holes in such ranges on each side of it become protectors at the sides as well as the ends of light-holes, in combination with oval glasses or lenses cemented or fixed within such oval light-holes.

5. A perforated plate or grating-tile formed with light-holes placed end to end in line with a button or knob between the ends of each hole.

6. A perforated plate or grating-tile formed with parallel ranges of light-holes, the light-holes being placed end to end, with buttons or knobs between the ends, the light-holes of each range breaking joints with the light-holes of the ranges immediately on each side of it, so that the buttons or knobs between the ends of the light-holes in such ranges on each side of it become protectors at the sides as well as at the ends of the light-holes.

7. A perforated plate or grating-tile formed with parallel ranges of light-holes, the light-holes being placed end to end, with buttons or knobs between the ends, the light-holes of each range breaking joints with the light-holes of the ranges immediately on each side of it, so that the buttons or knobs between the ends of the light-holes in such ranges on each side of it become protectors at the sides as well as at the ends of light-holes, in combination with glasses cemented or fixed within such light-holes.

8. As a new patent-light material for manufacturing illuminating-gratings, an oval lens, properly shaped and proportioned for combination with metal gratings to be set with glass for illuminating purposes.

9. As a new patent-light material for manufacturing illuminating-gratings, an oval lens formed upon an oblong base, properly shaped and proportioned for combination with metal gratings to be set with glass for illuminating purposes.

In testimony whereof I affix my signature in presence of two witnesses.

THADDEUS HYATT.

Witnesses:
T. C. BRECHT,
ALEX. SIMON.